United States Patent
Wirola et al.

(10) Patent No.: US 9,641,814 B2
(45) Date of Patent: May 2, 2017

(54) CROWD SOURCED VISION AND SENSOR-SURVEYED MAPPING

(75) Inventors: Lauri Wirola, Tampere (FI); Jari Syrjarinne, Tampere (FI)

(73) Assignee: Nokia Technologies Oy, Espoo (FI)

( * ) Notice: Subject to any disclaimer, the term of this patent is extended or adjusted under 35 U.S.C. 154(b) by 510 days.

(21) Appl. No.: 13/697,589

(22) PCT Filed: May 19, 2010

(86) PCT No.: PCT/IB2010/052229
§ 371 (c)(1),
(2), (4) Date: Jan. 17, 2013

(87) PCT Pub. No.: WO2011/144966
PCT Pub. Date: Nov. 24, 2011

(65) Prior Publication Data
US 2013/0201365 A1 Aug. 8, 2013

(51) Int. Cl.
*H04W 24/00* (2009.01)
*H04N 9/04* (2006.01)
*G01S 5/02* (2010.01)
*H04W 64/00* (2009.01)

(52) U.S. Cl.
CPC ............. *H04N 9/04* (2013.01); *G01S 5/0263* (2013.01); *H04W 64/00* (2013.01)

(58) Field of Classification Search
CPC .......... G01S 17/89; G01S 19/41; G01S 19/42; G01S 19/47; G01S 13/865; G01S 13/867; G01S 5/0072; G01S 17/06; G01S 19/48; G01S 5/0252; G01S 5/0294; G01S 19/51; G01S 5/14; G01S 5/30; H04W 64/00

USPC ........................................................ 455/456.1
See application file for complete search history.

(56) References Cited

U.S. PATENT DOCUMENTS

| | | | | |
|---|---|---|---|---|
| 5,959,575 A | * | 9/1999 | Abbott | 342/357.31 |
| 6,009,359 A | * | 12/1999 | El-Hakim et al. | 701/28 |
| 6,349,249 B1 | * | 2/2002 | Cunningham | 701/28 |
| 6,608,913 B1 | * | 8/2003 | Hinton et al. | 382/104 |
| 6,711,475 B2 | * | 3/2004 | Murphy | 701/3 |

(Continued)

FOREIGN PATENT DOCUMENTS

| | | |
|---|---|---|
| CN | 1981206 A | 6/2007 |
| CN | 101018402 A | 8/2007 |

(Continued)

OTHER PUBLICATIONS

Klingbeil L. et al., "Multi-modal Sensor Data and Information Fusion for Localization in Indoor Environments", 2010 7th Workshop on Positioning Navigation and Communication, IEEE, Mar. 11-12, 2010, Dresden, Germany, ISBN 978-1-4244-7158-4, pp. 187-192.

(Continued)

*Primary Examiner* — Kwasi Karikari
(74) *Attorney, Agent, or Firm* — Locke Lord LLP (57) ABSTRACT

A system for enhancing the provision of location information based on previously stored visual data. Apparatuses may utilize sensors to sense at least visual information at a location. The sensed visual information may include attributes that may be defined as one or more visual elements in the recorded visual information. The one or more visual elements may then be stored in a mapping database in association with the location.

14 Claims, 9 Drawing Sheets

(56) References Cited

U.S. PATENT DOCUMENTS

| | | | |
|---|---|---|---|
| 6,807,478 B2* | 10/2004 | Giannopoulos et al. | 701/434 |
| 6,917,893 B2* | 7/2005 | Dietsch et al. | 702/150 |
| 7,302,359 B2* | 11/2007 | McKitterick | 702/155 |
| 8,350,758 B1* | 1/2013 | Parvizi et al. | 342/452 |
| 8,463,018 B2 | 6/2013 | Chung et al. | |
| 2004/0189517 A1 | 9/2004 | Pande et al. | |
| 2007/0001904 A1* | 1/2007 | Mendelson | 342/450 |
| 2007/0026870 A1 | 2/2007 | Spain et al. | |
| 2007/0149216 A1 | 6/2007 | Misikangas | |
| 2007/0219711 A1 | 9/2007 | Kaldewey et al. | |
| 2007/0271011 A1* | 11/2007 | Lee et al. | 701/25 |
| 2008/0033645 A1* | 2/2008 | Levinson et al. | 701/213 |
| 2008/0153516 A1 | 6/2008 | Hsieh | |
| 2009/0043440 A1* | 2/2009 | Matsukawa et al. | 701/25 |
| 2009/0262974 A1* | 10/2009 | Lithopoulos | 382/100 |
| 2010/0106707 A1 | 4/2010 | Brown et al. | |
| 2010/0106745 A1 | 4/2010 | Cho et al. | |
| 2010/0121488 A1* | 5/2010 | Lee et al. | 700/245 |
| 2010/0123737 A1* | 5/2010 | Williamson et al. | 345/672 |
| 2010/0189312 A1* | 7/2010 | Nielsen et al. | 382/113 |
| 2011/0081919 A1* | 4/2011 | Das et al. | 455/456.1 |
| 2011/0199259 A1* | 8/2011 | Karaoguz et al. | 342/357.28 |

FOREIGN PATENT DOCUMENTS

| | | |
|---|---|---|
| CN | 101032183 A | 9/2007 |
| CN | 101046378 A | 10/2007 |
| CN | 101098543 A | 1/2008 |
| JP | 2007205948 A | 8/2007 |

OTHER PUBLICATIONS

International Search Report for International Application Serial No. PCT/IB2010/052229—Date of Mailing: Mar. 15, 2011, 6 pages.
English language machine translation of Japanese Patent Publication No. JP2007205948, 41 pages.
English language abstract corresponding to Japanese Patent Publication No. JP2007205948, 3 pages.
Extended European Search Report for European Patent Application No. 10851691.5, Dated Dec. 7, 2016, 10 pages.
International Search Report for International Application Serial No. PCT/IB2010/052230, Date of Mailing: Feb. 21, 2011, 6 pages.
Written Opinion of the International Searching Authority for International Application Serial No. PCT/IB2010/052230, Date of Mailing: Feb. 21, 2011, 7 pages.
Sato, T. et al., "Camera Position and Posture Estimation from a Still Image Using Feature Landmark Database", SICE Annual Conference Aug. 20-22, 2008, The University Electro-Communications, Japan, pp. 1514-1519.
Gu, Y. et al., "A Survey of Indoor Positioning Systems for Wireless Personal Networks," IEEE Communications Surveys & Tutorials, vol. 11, No. 1, First Quarter 2009, pp. 13-32.
International Search Report for International Application Serial No. PCT/IB2010/052231, Date of Mailing: Feb. 21, 2011, 6 pages.
Written Opinion of the International Searching Authority for International Application Serial No. PCT/IB2010/052231, Date of Mailing: Feb. 21, 2011, 6 pages.
English Language Machine Translation of Chinese Patent Publication No. CN101046378A—7 pages.
English Language Machine Translation of Chinese Patent Publication No. CN101018402A—24 pages.
PCT Written Opinion of the International Searching Authority for International Application No. PCT/IB2010/052229, Date of mailing: Mar. 15, 2011, 7 pages.
English Language Machine Translation of Chinese Patent Publication No. CN101032183A, 14 pages.
English Language Machine Translation of Chinese Patent Publication No. CN101098543A, 7 pages.
English Language Machine Translation of Chinese Patent Publication No. CN1981206A, 8 pages.
U.S. Appl. No. 13/697,604, filed Nov. 13, 2012, Wirola et al.
U.S. Appl. No. 13/697,637, filed Nov. 13, 2012, Wirola et al.

* cited by examiner

CROWD SOURCED VISION AND SENSOR-SURVEYED MAPPING

BACKGROUND

1. Field of Invention

The present invention relates to positioning and/or mapping, and in particular, to facilitating positioning and/or mapping through the use of previously stored sensor information.

2. Background

Wireless functionality continues to proliferate in modern society. User demand has driven developers to not only create new wireless-enabled apparatuses, but also to implement wireless functionality in existing applications that did not originally provide this ability. Further, the advent of flexible platforms has increased the product offering, and likewise, has increased user demand. Wireless functionality is no longer limited to audible communication (e.g., voice), but may be implemented in support of various applications that require the conveyance of data.

At least one communication-related application currently being offered in various forms is electronic positioning. Basic electronic positioning may provide the current location of an apparatus in terms of coordinates, in relation to visual presentation (e.g., map), etc. However, the means by which the raw positioning information is obtained may vary. Apparatus offerings may include the incorporation of Global Positioning System (GPS) receivers for obtaining the electronic positioning information from satellites. Further, long range wireless communication systems (e.g., cellular) may also provide electronic positioning information through methods such as cell-based triangulation, etc., while short-range wireless systems may be able to provide similar information through determination of proximity to a particular wireless access point, etc.

Electronic positioning in the out-of-doors may provide adequate performance for users because, in addition to electronic positioning information being readily available for quick position resolution, frequently updated maps may be available for most populated regions. The same conditions do not exist within structures (e.g., buildings). Map information that is specific to structure interiors may not be available, and the map information that is available may be too general (e.g., inaccurate). Moreover, global positioning signals do not propagate well indoors, and any positioning signals that are not blocked from entering a structure may not be dependable based on the prevalence of interference sources within structures. As a result, the performance of known positioning and/or mapping systems when implemented within structures may be very slow, if even functional at all, and may lack the accuracy required to be effective.

SUMMARY

Example embodiments of the present invention may be directed to methods, computer program products, apparatuses and systems for enhancing the provision of location information based on previously stored visual data. Apparatuses may utilize sensors to sense at least visual information at a location. The sensed visual information may include attributes that may be defined as one or more visual elements in the recorded visual information. The one or more visual elements may then be stored in a mapping database in association with the location.

In accordance with at least one embodiment of the present invention, apparatuses may sense at least visual information related to a location. The location may be, for example, in a structure (e.g., building), and the visual information may be electronic images, video streams, etc. of the location. The recorded visual information may comprise element information such as one or more attributes usable for both identifying the location (e.g., for fixing the position of the location within the structure) and for determining a relative or absolute position of an apparatus within the location. Example attributes may comprise objects, openings, shapes, colors, etc.

The element information may then be utilized in creating a representation of the location in a mapping database by recording the element information in correspondence to the location in the mapping database. In some instances, the correspondence between the element information to be stored and element information already stored in the database may not always be readily apparent. Other information associated with the location (e.g., sensed signal strength and/or field strength information) may then be utilized to identify the proper association within the mapping database for storing the element information. In this manner a representation of the entire structure, based on visual information captured at various locations within the structure, may be formulated. The representation if the entire structure may, for example, be utilized for electronic positioning. Electronic positioning may comprise providing relative and/or absolute apparatus position to the user of the apparatus in terms of an identifiable location within the structure, coordinates, directions to getting to a desired location, etc. Further, in some instances the visual element information stored in the mapping database may be comprehensive enough so that a map of the interior of the structure that is displayable on the apparatus may be compiled, and the relative and/or absolute position of the apparatus may be shown to the user on the apparatus within the confines of the displayable map.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which.

DESCRIPTION OF EXAMPLE EMBODIMENTS

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Figure 1:
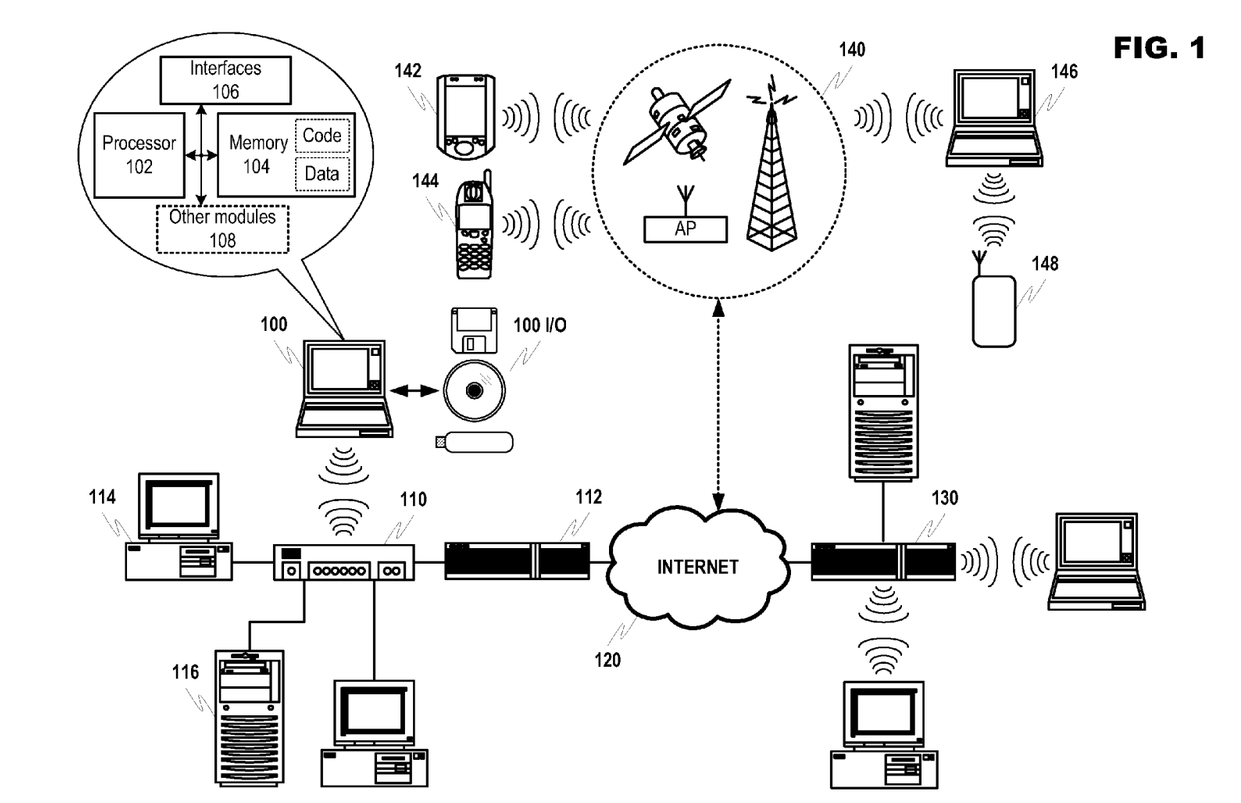
FIG. 1 discloses example apparatuses, communication configuration and network architecture usable in implementing at least one embodiment of the present invention.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 2:
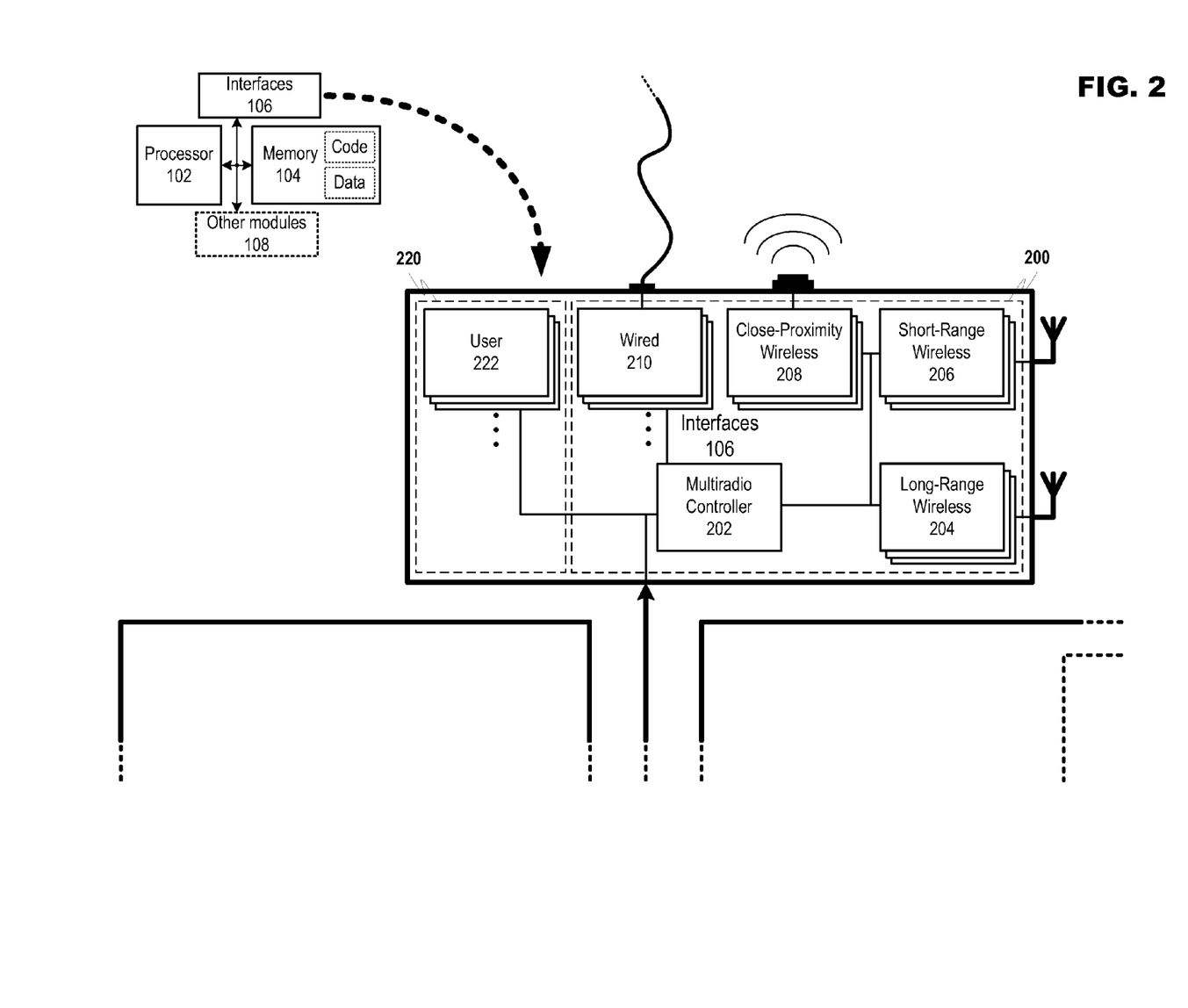
FIG. 2 discloses additional detail with respect to example communication interfaces usable with at least one embodiment of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

Figure 3:
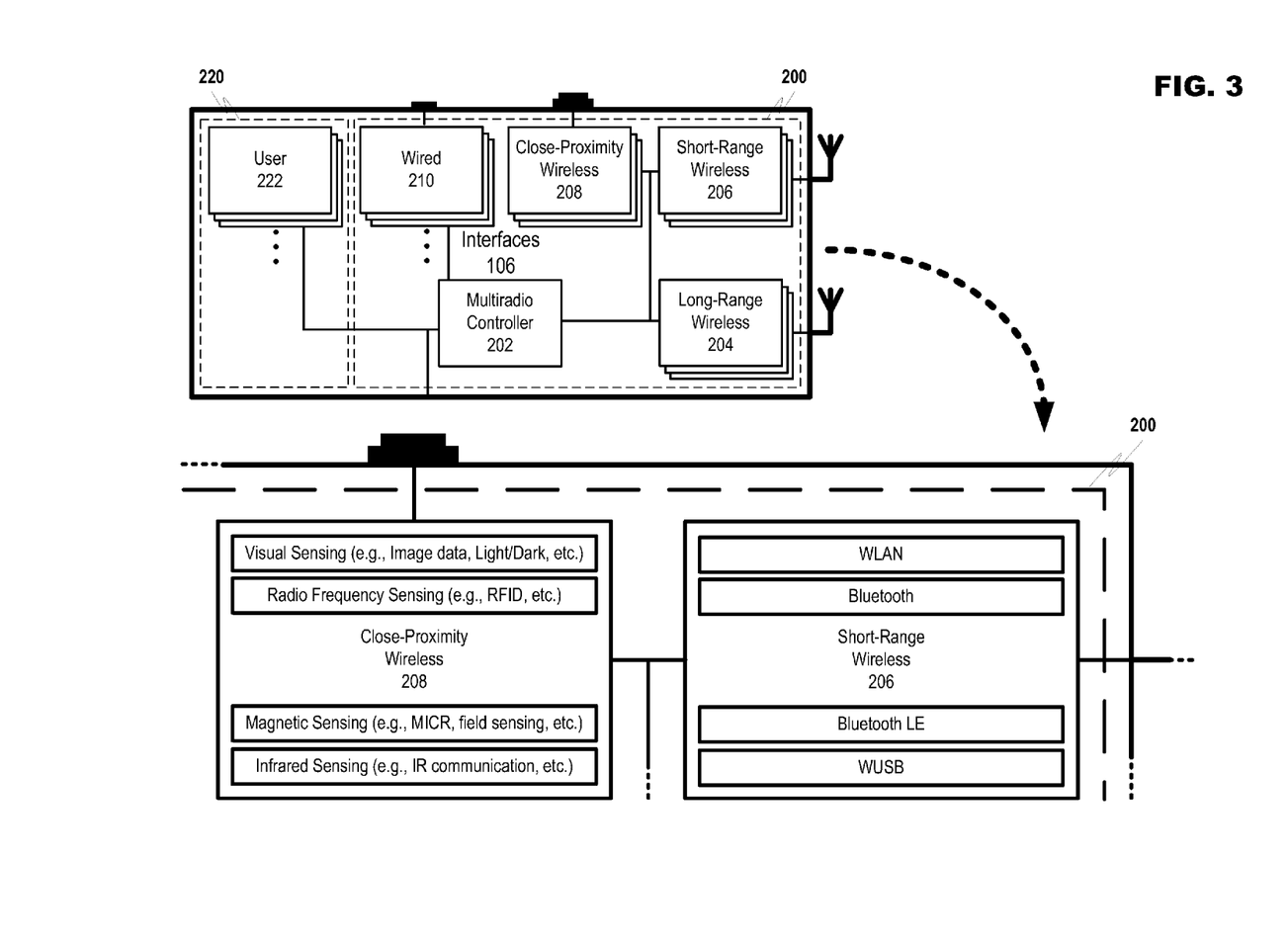
FIG. 3 discloses additional detail with respect to example close proximity and short range wireless resources usable with at least one embodiment of the present invention.

The example communication interface configuration 106 disclosed in FIG. 2 may, in accordance with at least one embodiment of the present invention, further comprise example close-proximity wireless interfaces 208 such as set forth in FIG. 3. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth communication, Bluetooth Low Energy communication, wireless Universal Serial Bus (WUSB) communication, etc. These forms of communication may, in various applications, support wireless interaction between two or more handheld wireless communication devices, between a handheld wireless communication device and a stationary access point (AP), to peripheral interface devices, etc.

II. Example Operational Environment

Assisted global positioning (A-GPS) and other electronic positioning solutions based on wireless communication may perform acceptably and may provide extensive coverage outdoors where the signal quality and number of satellites/base stations are typically very good. This performance may be bolstered by accurate maps featuring terrain features, roads, traffic conditions and other related information have been mapped exhaustively and are constantly maintained from satellite images, aerial photography, feedback from user communities, etc. Together, the available positioning solutions and the feature-rich maps may provide excellent user experiences (e.g., such as in instances including vehicle and pedestrian navigation use).

The situation becomes totally different when the navigation is brought indoors. Known positioning technologies have very limited capabilities indoors, and thus, usually fail. There are many reasons for these failures. Initially, existing positioning/mapping solutions may be expensive and difficult to implement. Map information does not exist for many public/private structures, and the provision of this information requires extensive modeling visualization and/or mapping that is currently only provided by private companies. Further, existing solutions may provide unstable and/or unpredictable performance, which may occur to do external positioning signals being unavailable or unreliable and indoor signals lacking sufficient position resolution.

The various embodiments of the present invention may provide a means for faster and more accurate position determination in scenarios where traditional positioning techniques may be unavailable or inadequate. An example of a problematic situation is providing electronic positioning within a structure such as a building. While positioning within a building will be utilized for the sake of explanation herein, the various embodiments of the present invention are not limited only to use in this specific application. Almost any situation where traditional positioning techniques do not provide adequate performance (e.g., speed, resolution, etc.) may experience improvement through the following example embodiments and/or implementations of the present invention.

Figure 4:
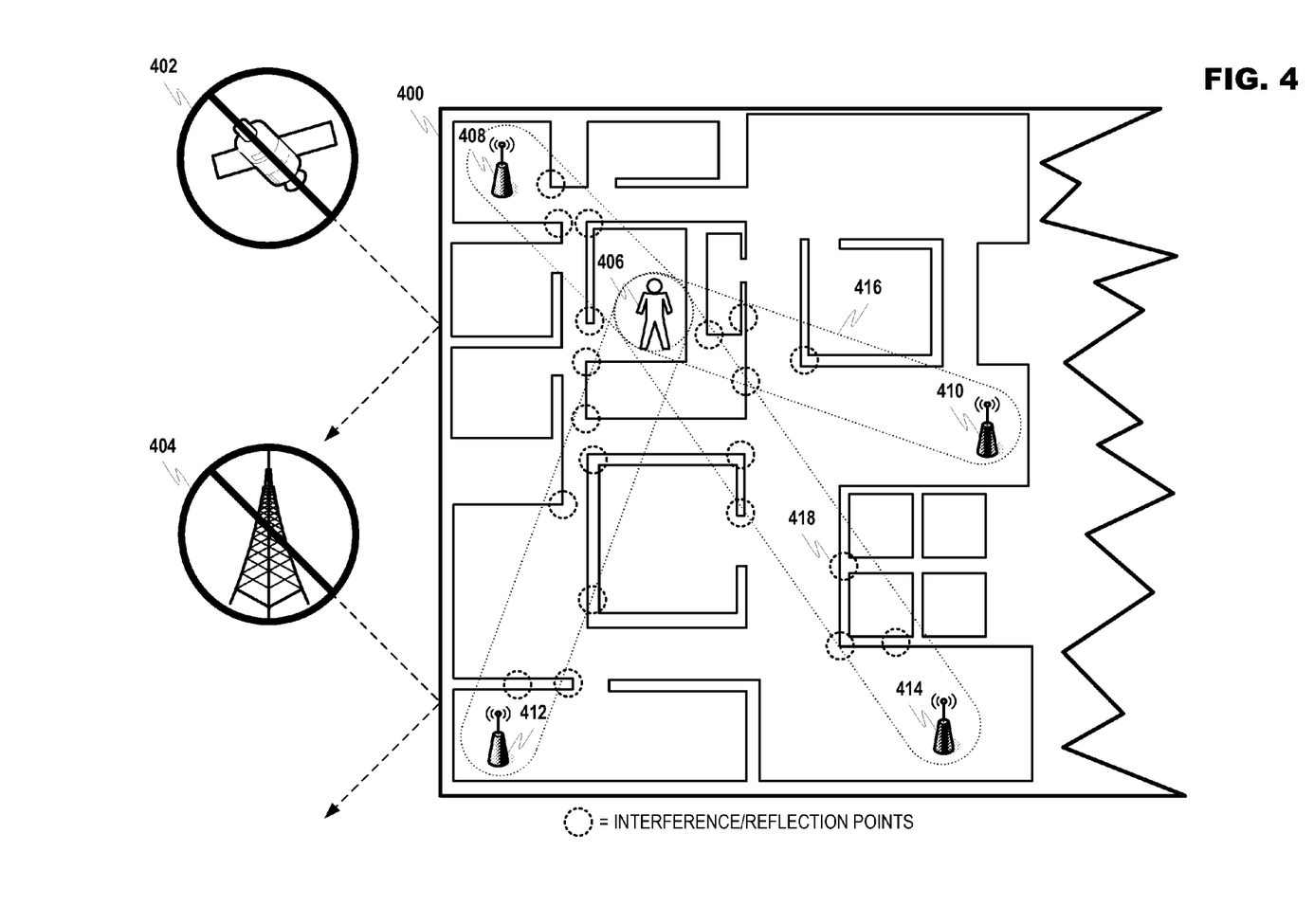
FIG. 4 discloses an example operational environment and the challenges presented therein in accordance with at least one embodiment of the present invention.

Partial floor plan 400 disclosed in FIG. 4 will help to explain various challenges to traditional electronic positioning that may be experienced within a structure (e.g., building). Information received from satellites 402 and long-range transmission 404 (e.g., cellular) may be effective when outside where these signals may be efficiently received. However, structures may present physical obstacles that significantly reflect, or totally block, such signals as shown in FIG. 4. User 406 may then have to rely on wireless electronic communication provided within a building in order to electronically determine position. For example, wireless access points (AP) 408, 410, 412 and 414 may provide electronic wireless communication as shown in floor plan 400. In additional to simply providing data communication (e.g., access to the LAN or WAN resources such as the Internet). These access points may also provide positioning information. Various methods for determining position may be employed, each with differing amounts of accuracy. For example, connection 416 to a particular AP (e.g., AP 408) indicates that user 410 is within communication range of that AP. However, the resolution provided by such an estimation is extremely inexact, especially within the smaller confines of a building.

Further, signals from various access points may be utilized for various position finding algorithms. For example location triangulation based on connection to more than one AP or direct-of-arrival (DoA) estimation in order to determine the relative direction from a receiver towards the emitter of a signal may be employed. However, the various signals 416 emitted by AP 408-414 may experience substantial interference/reflection points 418 within a building or structure. For example, walls containing metallic conduits, hallways containing various corners and other objects, elevator shafts and other high power equipment may cause signal interference or reflection 418. Interference/reflection points 418 may result in AP signals 416 being delayed significantly, or not being received at all. Further, these signals may be received from directions that do not indicate the actual direction from which the signal was originally sent, and thus, may cause delays or inaccuracy when employing these traditional position finding techniques.

III. Example Extended Fingerprints

In accordance with at least one embodiment of the present invention, a solution that is both scalable and global is disclosed for providing electronic positioning functionality in situations that may be problematic for existing positioning and/or mapping systems. Electronic positioning/mapping may be based on "crowd-sourced" information that may comprise, for example, location-related information that is collected by users and that is voluntarily provided for positioning/mapping purposes. The crowd-sourced information may further be considered "sensor-surveyed" in that the information may be recorded by sensors in user apparatuses. At least some of the sensed information may then be stored in one or more databases as "extended fingerprints" that may comprise elements extracted from the sensed information that are usable for positioning/mapping. For example, extended fingerprints may comprise visual landmarks extracted from images or video streams captured at a location. In some implementations extended fingerprints may also include other location-related information, such as radio and/or motion sensor data, that may be usable in ambiguity removal that may occur when combining extended fingerprints into a representative mapping database. The mapping database may then be utilized as a source for physically-constrained radio maps that enable efficient use of vision sensors alone or in combination with global navigation satellite systems (GNSS), cellular and/or short-range wireless communication and motion sensors for indoor navigation generated either locally in the user apparatus or collectively with mapping servers in wireless communication.

Physically-constrained radio maps are not analogous to indoor maps as they may be understood in the art. Physically-constrained radio maps may comprise a collection of features (e.g., building and/or internal structure characteristics) that may be beneficial for more accurate 2D/3D apparatus positioning, not features that are valuable/meaningful to enhancing the user interface of the apparatus (e.g., to enhancing the presentation of a map that reflects the current position of an apparatus). Thus, indoor map data is directed to improved location visualization (e.g., displaying building maps and their interiors to users, routing information for the navigation etc.). This map data does not (necessarily) have the same format nor the same visual attributes or the links to other sources of location information than the physically-constrained radio map.

Extended fingerprints should not be thought of as containing full visual images of locations, but as collections of representative 2D/3D physical elements and attributes such as walls, roofs, colors, window and door positions, exit signs, WLAN AP positions etc. More specifically, these visual elements are not generic frequency domain features obtained from a single image or from a video stream by, for example, Scale-Invariant Feature Transform (SIFT). They may also be combined with RF environment (e.g., WLAN/CI AP, RSSI) measurements, relative scale and orientation (e.g. compass) measurements used to refine element placement.

In at least one example implementation, it may also be possible to rely on user interaction to fix the orientation of visual elements contained in the extended fingerprint, to add other relevant information and attributes such as level, address, etc., and to manually edit the extracted attributed/features e.g. using a predefined object library. These actions may help to further refine the location approximation provided by the positioning system. Further, visual information contained in extended fingerprints does not necessarily include the following items to avoid privacy violation issues: the actual raw image, the faces of persons that may have been present when the image was created and audio information that may have been recorded when the image was created. Extended fingerprint information may be recorded in mapping databases. Mapping databases may comprise a local or remote information storage location where extended fingerprints or a series of extended fingerprint may be collected from contributing terminals. It is also possible for mapping databases to store multiple extended fingerprints representative of the same location (e.g., feature map) which may be constantly updated/upgraded based on inputs received from contributing apparatuses.

IV. Example Visual Element Capture and Processing for Extended Fingerprints

While the following disclosure focuses on visual information capture and processing in order to define visual elements existing within the visual information, visual information is just one example of sensed information that may be stored in an extended fingerprint. As discussed further with respect to ambiguity removal, other forms of sensed information may be captured at a location and stored in association with an extended fingerprint.

Figure 5A:
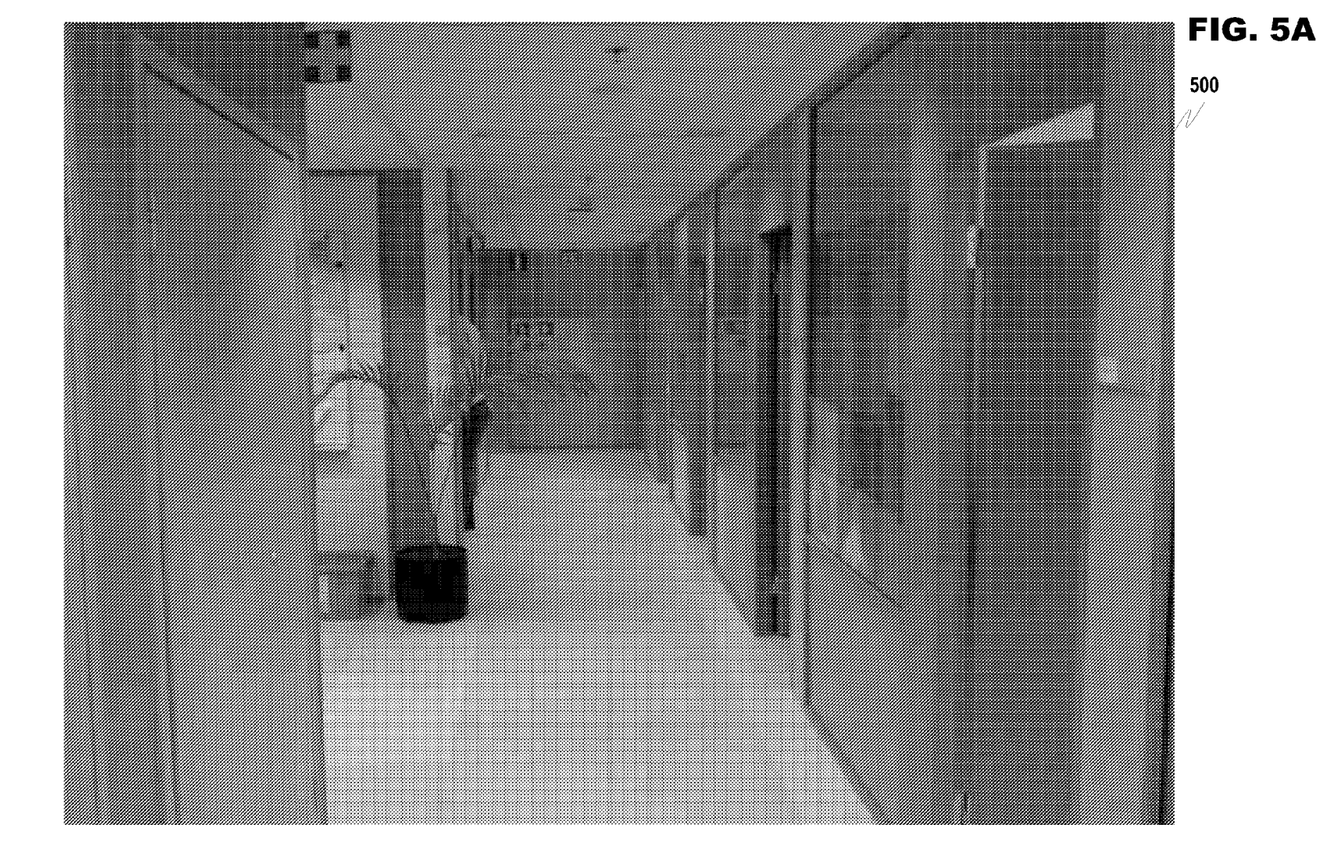
FIG. 5A discloses example visual information in accordance with at least one embodiment of the present invention.

Visual element information contained in extended fingerprints may be obtained manually or automatically from vision sensors in participating apparatuses. Example vision sensors may include, but are not limited to, cameras, video cameras or stereo-cameras that may generate continuous location fixes either by determining the location of the user of the images or measuring the motion from the stream of images (video) or stream of elements extracted from the images/videos. An example of visual information is disclosed in FIG. 5A at 500. While image information 500 is a picture of a building hallway, various embodiments of the present invention are not limited only to use in such an area. The example discloses a typical hallway that might be found in an office building, and thus, includes features that would be found in a typical office building hallway.

Figure 5B:
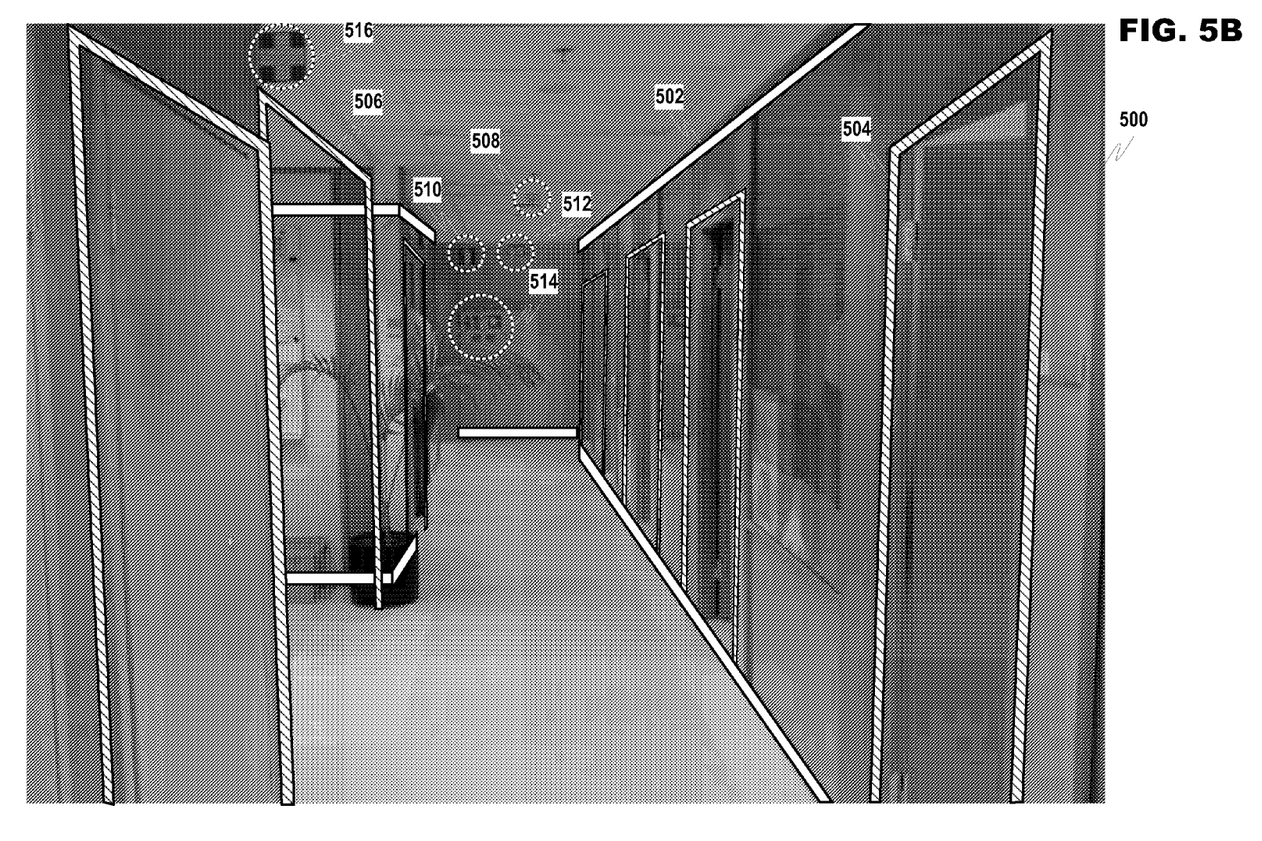
FIG. 5B discloses example element definition within the visual information in accordance with at least one embodiment of the present invention.

Now referring to FIG. 5B, an example of element extraction from a single image is disclosed. The visual sensor (in this case camera) may capture images while users walk and/or navigate indoors. The user may be further using the apparatus in a "see-through" fashion, where the indoor map may be superimposed on the screen, and feature extraction may then proceed in the following manner. Initially, a two dimensional (2-D) or three dimensional (3-D) layout may be extracted by projecting dimensional limitation elements from the image/video stream to an empty "canvas" or floor plan. The layout dimensions for the hallways in visual information are disclosed by solid white lines 502 in FIG. 5B. Next, doors, open areas, staircases, windows may be defined in visual information 500. Doors 504 and open areas 506 (e.g., intersecting hallway openings) are defined in visual image information 500 by upper left to lower right crosshatching. The aforementioned opening definition may further comprise defining/measuring the scale (e.g. from height of a door, intersecting hallway, etc.) of the elements that are identified in the visual information. The defining/measuring may, for example, be based on known values in the image information, such as the height of a ceiling, dimensions of doors, height of people, etc. Further element definition may comprise the identification of additional attributes in the visual information. These attributes may comprise signage (e.g., exit signs 512 and emergency signs 514), fire extinguishers 510 and other emergency related aspects 516, wall color and/or markings, wall and ceiling attributes such as light switches, WLAN AP antennas, etc.

Further, element definition may further comprise locating access points such as disclosed at 508. Access point definition may help to tie the visual location to actual location with respect to distance from the access point. Thus, in instances where corresponding element information is not readily identifiable in a mapping database, information such as location with respect to an access point may help resolve corresponding elements. In some instances, the identification and definition of an access point within visual information may prompt the apparatus that captured the image information to also performing sensing for signals from the access point. In this manner, position information (e.g., either absolute or relative with respect to the access point) may be obtained and recorded along with visual image information 500.

Figure 6:
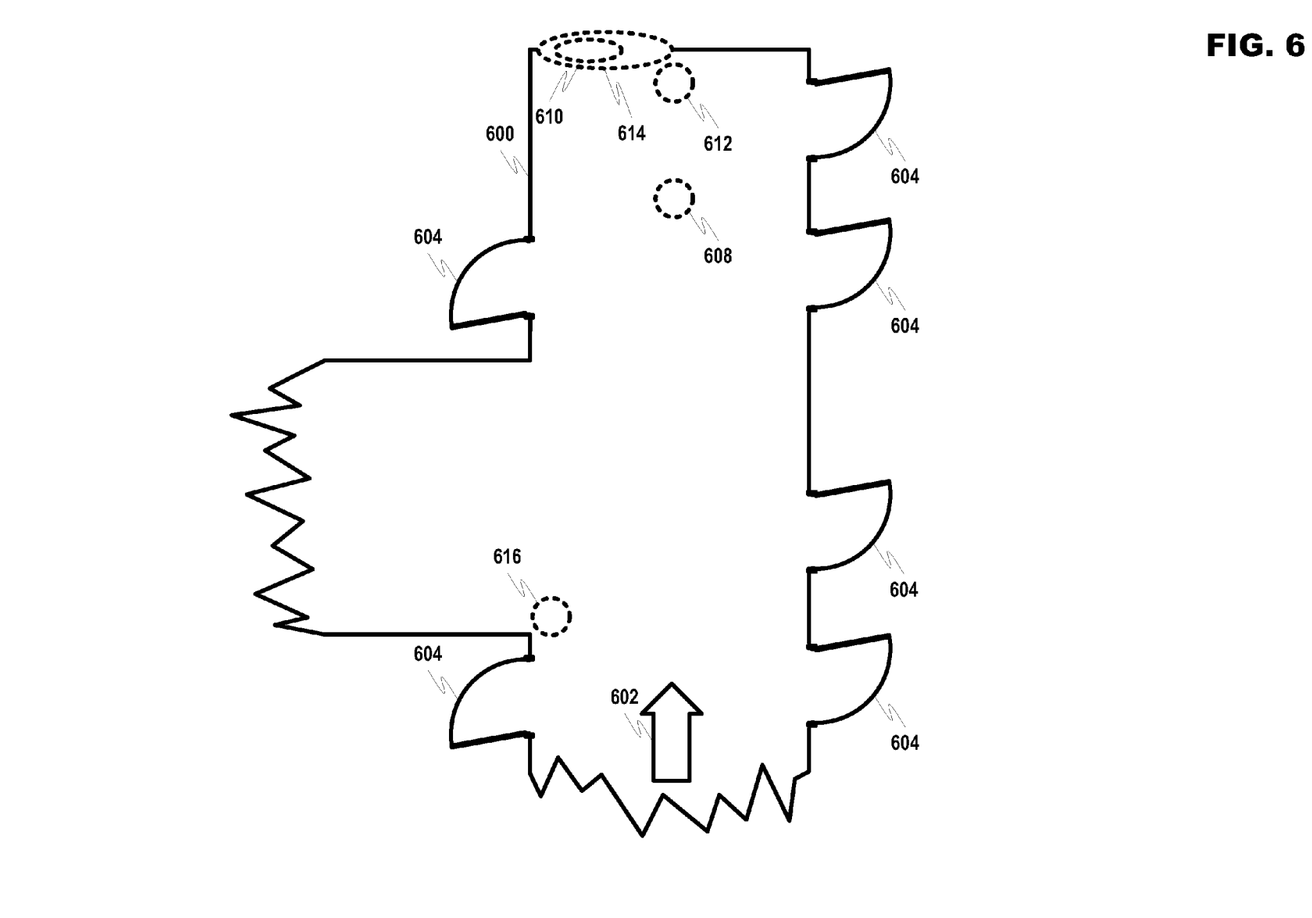
FIG. 6 discloses an example representation of a location based on visual information in accordance with at least one embodiment of the present invention.

The features extracted from the image (e.g., defined in the extended fingerprint) may be organized such as set forth in FIG. 6. As can be seen the extended fingerprint may not be usable as an indoor map by itself, as it is limited to the visual range of the sensor at the time the image was recorded (e.g., does not see through the walls or behind the doors), but it is extremely useful for positioning and making the visual sensor and useful source for location information. Extended fingerprint 600 may comprise some or all of the features that were defined in FIG. 5B. For example, extended fingerprint 600 may comprise hallway dimensions based on dimensions 502, may have doors 604 based upon defined door openings 504. Further, the representation may indicate the presence of access point 608 based on the defined location 508, and may comprise various signage or other objects 610-616 based on the definitions 510-516 made in visual image 500. Further, the representation may comprise information 602 that identifies the direction from, and possibly even the actual position of, the apparatus when the image information was captured. In accordance with at least one embodiment of the present invention, image information 500, or video streams, etc., may not be transmitted to a mapping server in their original captured form, but only the extracted features/attributes may be sent. Providing extracted feature/attribute information to mapping servers not only conserves space by reducing the amount of data to be stored in mapping databases, but may also avoid privacy issues in that no sensitive or private image information may be transmitted to, or stored on, mapping servers.

At least one important aspect of vision and sensor-surveyed mapping database generation is crowd-sourcing. An advantageous implementation of database generation is to integrate "harvesting" of extended fingerprint information with the protocols and software of already-implemented frameworks (e.g., frameworks for WiFi/cellular-ID data collection). As in at least one example implementation extended fingerprint information does not carry the actual images (only data relevant for the indoor navigation), any privacy-related issues may be avoided.

Figure 7:
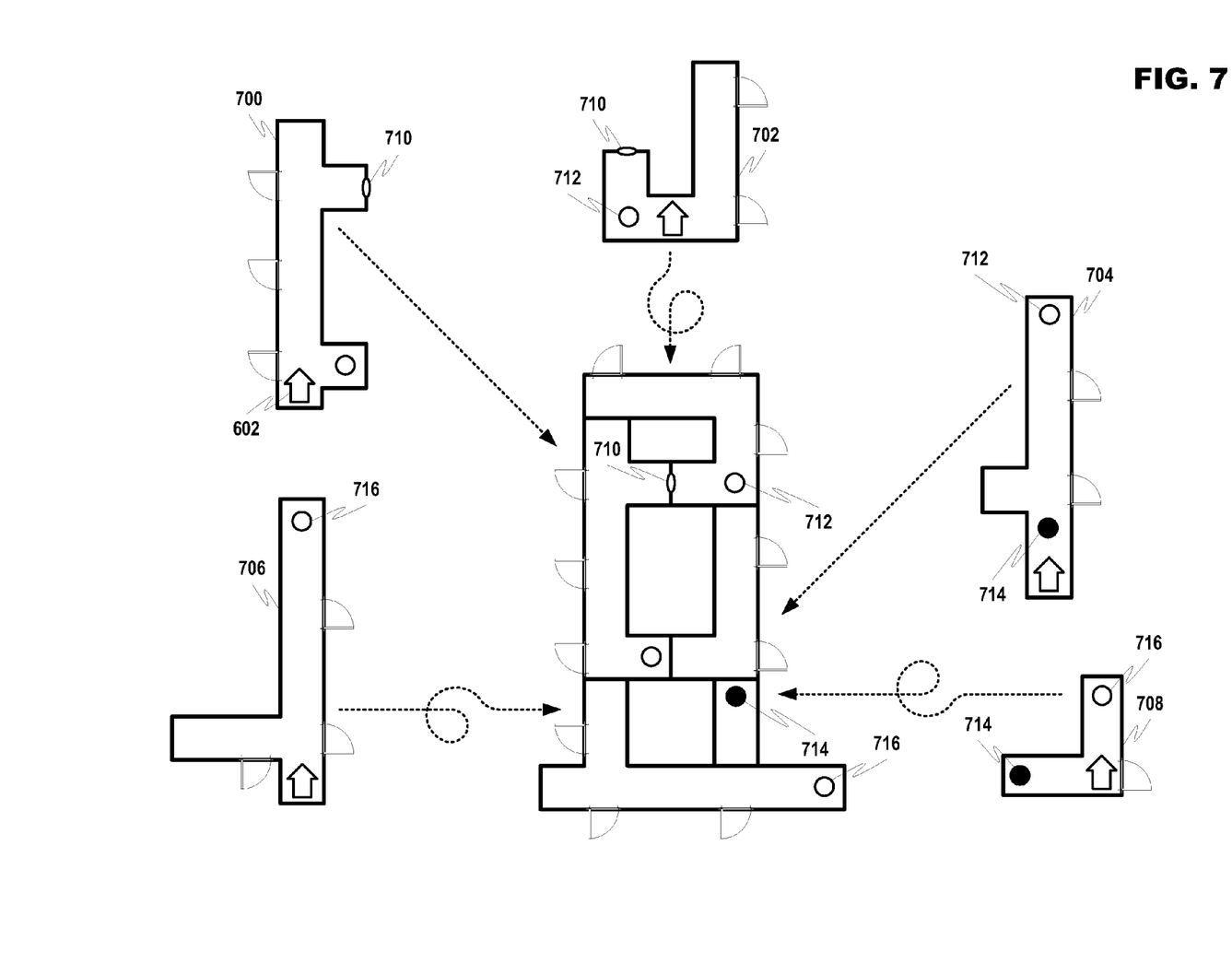
FIG. 7 discloses an example of creating a representative map of a location based on visual information in accordance with at least one embodiment of the present invention.

In accordance with at least one embodiment of the present invention, extended fingerprints may be stored and then assembled into a representation of a larger area (e.g., into a physically-constrained radio map. FIG. 7 discloses an example of a floor plan being generated based on individual extended fingerprints. The mapping system may retrieve extended fingerprints from various sources (e.g., user apparatuses, building cameras, etc.) and may combine them to form mapping databases. In FIG. 7 individual extended fingerprints 700, 702, 704, 706 and 708 may each have been recorded from perspective indicated in each extended fingerprint by arrow 602. In particular, the apparatus that recorded each extended fingerprint may have been in located in the relative position indicated by arrow 602, and the visual sensor (e.g., camera) in the apparatus may have been pointing in the direction in which each arrow 602 is pointing. The individual extended fingerprints may be combined together based on common elements. For example, element 710 may exist at a hallway intersection between extended fingerprints 700 and 702. Similarly, element 712 may exist in both extended fingerprints 702 and 704, element 714 may exist in both extended fingerprints 704 and 708, and element 716 may exist in both extended fingerprints 706 and 708. These common elements may help to "reassemble" the extended fingerprints, and be used to associate these extended fingerprints in the mapping database.

It is evident in the example of FIG. 7 that the perspective indicated by arrow 602, from which each extended fingerprint was recorded, may not facilitate the "direct" association of the individual extended fingerprints into the whole. This may occur because there is no limitation or standard that controls the direction or orientation from which the extended fingerprints are recorded. Thus, as shown with respect to extended fingerprints 702, 706 and 708, the processing device (e.g., the recording apparatus or a remote entity like the mapping database) may have to reorient the extended fingerprint before elements within the extended fingerprint may be associated with the same elements that were already recorded in the mapping database associated with other extended fingerprint. Reorientation may comprise rotating or "spinning" the perspective so that the same elements may be associated in the mapping database.

Physically-constrained radio maps may be generated from the mapping database after enough representative extended fingerprints have been recorded. More specifically, the extended fingerprints may be combined locally in the apparatus alone, or in combination with remotely located processing resources such as mapping servers, to create representative 2-D or 3-D feature maps of a particular location (e.g., building maps including floor/room/indoor area specificity). Scaling and projection corrections may be based on the visual elements extracted from the images, but once combined the scale factors, rotations, etc., may be normalized and corrected based on standards established in the mapping database. In accordance with at least one embodiment of the present invention, scaling and/or reorientation-related processes may occur in either the sensing apparatus (e.g., based on element information) in the mapping database (e.g., based on the extended fingerprints already stored in the database), or may occur in both entities as part of the overall sensing, element extraction and extended fingerprint storage processes.

In some instances feature-based maps may not be usable as indoor maps that are presentable to a user as there will probably be gaps, blind corners, etc., that may not be accurately recorded, but may still be useful for positioning purposes. In at least one example usage scenario, information sensed regarding the current surroundings of an apparatus may be compared to a physically-constrained radiomap that resides locally in the apparatus or remotely (e.g., in mapping servers). The results of the comparison may by used to approximate a relative (e.g., with respect to other local landmarks that may be near the current position of an apparatus) or absolute (e.g., based on a larger coordinate system such as global positioning measurements) position for apparatuses. Aside from just providing current position, physically constrained radiomaps may also be used for other applications like directing users to other areas within the structure. It may even be possible that enough element information is collected in the mapping database so that a map displayable to users may be compiled. Users may then be shown current apparatus position within the confines of the displayable map so that the users may visually relate their location to their immediate surroundings, to their desired objective location, etc.

It may be relatively easy to merge extended fingerprints into a mapping database relying on matching visual elements defined in the images when extracted element information is reported by only a single apparatus operating at a constant rate. However, problems may emerge when different apparatuses perform feature mapping at random times, at various locations and with variable groups of extracted elements. For example different objects may exist at a location at different times, and thus, differences in extended fingerprints corresponding to the same location may be unavoidable. Such variable conditions are not unexpected, especially when the various extended fingerprints are obtained through crowd-sourcing. Problems may also occur based on a lack of differentiation. If a building does not have much visual differentiation (e.g., typical office buildings usually have the same interior design from floor to floor), it may be challenging to merge extended fingerprints by relying on extracted visual element alone.

At least one of proposed alternative for spatial "ambiguity" removal is through the use of other sensor information (e.g., WiFi measurements) to provide coarse position information for locating extended fingerprints. For example, mapping servers may receive extended fingerprints comprising wireless signal information from an apparatus. The mapping server may then receive extended fingerprints containing wireless signal information from another apparatus at a different time instant. Once the mapping database has a sufficient amount of entries, a server may start "mining" the DB. In accordance with at least one embodiment of the present invention, mining may be initiated by sorting and/or clustering extended fingerprint information according to wireless fingerprints (e.g., by linking any APs defined as elements) and may then analyze similarities and matches in visual elements, taken along with wireless signal information provided with the visual elements, in order to merge the extended fingerprints into a combined representation in a mapping database.

Figure 8:
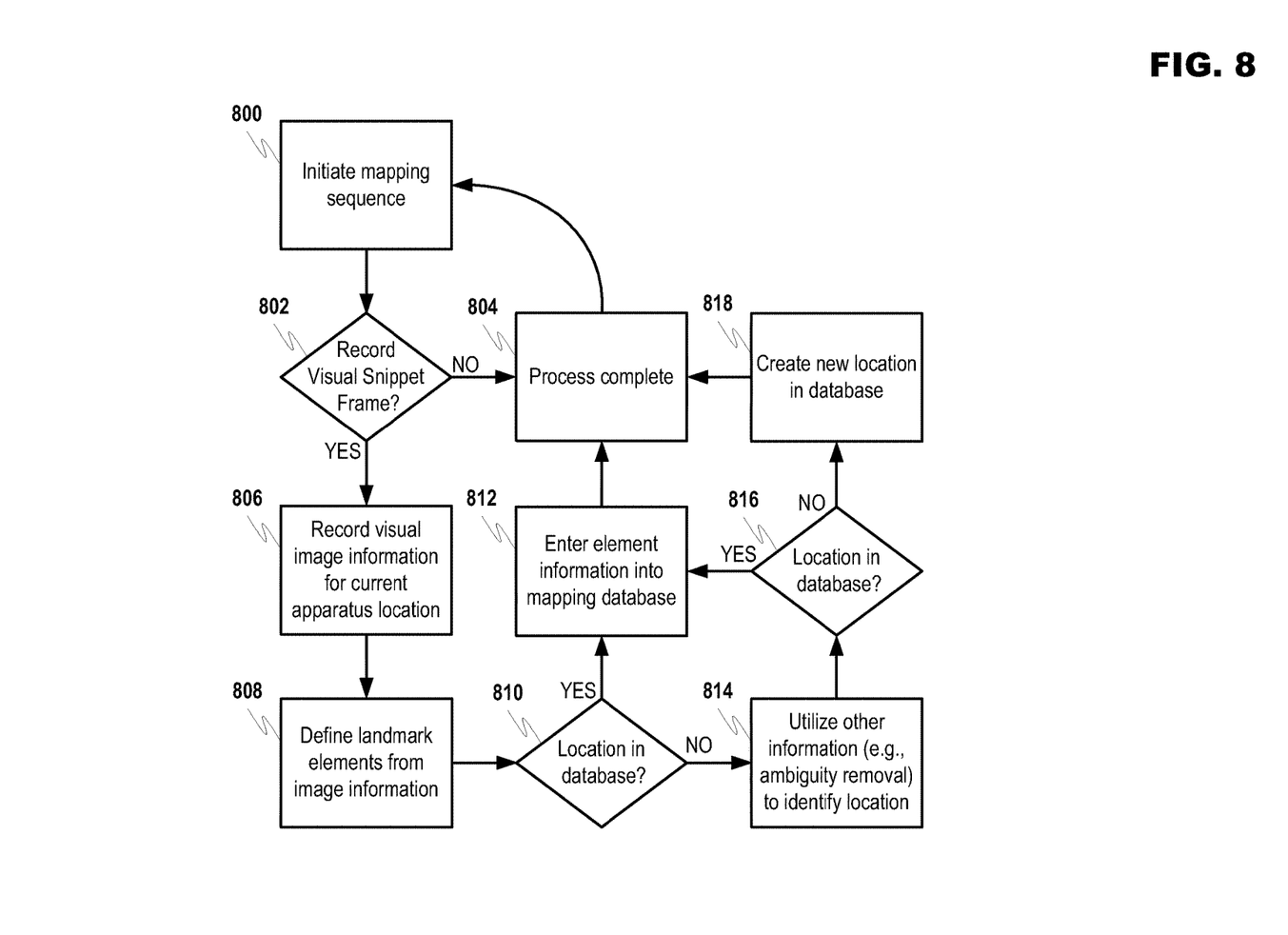
FIG. 8 discloses a flowchart for an example visual information recording and storage process in accordance with at least one embodiment of the present invention.

A flowchart of an example process for visual information capture and storage, in accordance with at least one example embodiment of the present invention, is now disclosed in FIG. 8. The mapping process may initiate in step 800. A determination may then be made in step 802 as to whether an extended fingerprint should be created for a location (e.g., the current location of an apparatus). If no extended fingerprint is required (e.g., the location has already been recorded in the mapping database), then in step 804 the process may be terminate in step 804 and return to step 800 to prepare for the next mapping sequence. In an alternative embodiment of the present invention, step 802 may be omitted as extended fingerprint information may always be captured for use updating the information existing in a mapping database. Such an embodiment may be utilized, for example, where information is provided by crowd-sourcing.

If it is determined in step 802 that a new extended fingerprint should be stored, then in step 806 visual image information may be stored for the current apparatus location. This information may be captured via a visual sensor (e.g., a camera) in the apparatus. In step 808 the visual information may be processed in order to define landmark elements existing within the extended fingerprint. These elements may then be compared to the mapping database to see if the elements have already been stored. This evaluation may help to associate the elements from the extended fingerprint with the corresponding location from which the image information was obtained. If the proper associations can be identified in the mapping database, the element information may be entered in step 812 and the process may again terminate in step 804.

However, if the proper associations cannot be identified in step 810, then in step 814 other associated information may be utilized, for example in terms of an ambiguity removal process, in order to identify the location from which the extended fingerprint was created. If in step 816 the location is identified, then the information may be recorded in the mapping database corresponding to the actual location and the process may again terminate in step 804. However, if the proper location cannot be defined for the element information in step 816, the process may then move to step 818 where a new location is created in the mapping database for the elements defined from the extended fingerprint information. The process may again terminate in step 804 and return to step 800 in preparation for initiation of the next mapping sequence.

While various exemplary configurations of the present invention have been disclosed above, the present invention is not strictly limited to the previous embodiments.

For example, the present invention may include, in accordance with at least one example embodiment, an apparatus comprising means for utilizing sensing resources in an apparatus to sense at least visual information corresponding to the location of the apparatus, means for identifying attributes of the location by defining one or more visual elements within the visual information corresponding to the attributes, and means for creating a representation of the location in a mapping database by recording the one or more visual elements in association with the location in the mapping database.

At least one other example embodiment of the present invention may include electronic signals that cause apparatuses to utilize sensing resources in an apparatus to sense at least visual information corresponding to the location of the apparatus, identify attributes of the location by defining one or more visual elements within the visual information corresponding to the attributes, and create a representation of the location in a mapping database by recording the one or more visual elements in association with the location in the mapping database.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed is:

1. A method, comprising:
   utilizing sensing resources in an apparatus to sense at least visual information corresponding to the location of the apparatus;
   utilizing the sensing resources in the apparatus to sense electronic signals and/or fields at the location of the apparatus;
   identifying attributes of the location by defining one or more visual elements within the visual information corresponding to the attributes;
   extracting the defined one or more visual elements from the sensed visual information; and
   creating a representation of the location in a mapping database by recording the extracted one or more visual elements, rather than the sensed visual information, in association with the location in the mapping database,
   wherein recording the extracted one or more visual elements in association with the location in the mapping database comprises determining if any of the extracted one or more visual elements already exist in the mapping database by at least using the electronic signals and/or fields sensed at the location to find the extracted one or more visual elements in the mapping database.

2. The method of claim 1, wherein the sensing resources comprise at least a camera and the visual information is an electronic image captured at the location.

3. The method of claim 1, wherein the attributes of the location may comprise physical objects, hallways, doorways, shapes or colors in the location.

4. The method of claim 1, wherein recording the one or more visual elements in association with the location in the mapping database comprises identifying the location as a new location when the one or more visual elements do not already exist in the mapping database.

5. The method of claim 1, wherein the mapping database comprises representations for one or more locations that are combined together in the mapping database to form a map, the one or more locations being combined together based at least on common visual elements in the one or more visual elements corresponding to each representation of a location.

6. The method of claim 5, wherein the map corresponds to a structure interior, the representations of locations corresponding to areas within the structure interior.

7. A computer program product comprising computer executable program code recorded on a non-transitory computer readable storage medium, the computer executable program code comprising:
   code configured to cause an apparatus to perform the method of claim 1.

8. An apparatus, comprising:
   at least one processor; and
   at least one memory including executable instructions, the at least one memory and the executable instructions being configured to, in cooperation with the at least one processor, cause the apparatus to perform at least the following:
   utilize sensing resources in an apparatus to sense at least visual information corresponding to the location of the apparatus;
   utilize the sensing resources in the apparatus to sense electronic signals and/or fields at the location of the apparatus;
   identify attributes of the location by defining one or more visual elements within the visual information corresponding to the attributes;
   extract the defined one or more visual elements from the sensed visual information; and
   create a representation of the location in a mapping database by recording the extracted one or more visual elements, rather than the sensed visual information, in association with the location in the mapping database,
   wherein recording the extracted one or more visual elements in association with the location in the mapping database comprises the at least one memory and the executable instructions being configured to, in cooperation with the at least one processor, cause the apparatus to determine if any of the extracted one or more visual elements already exist in the mapping database by at least using the electronic signals and/or fields sensed at the location to find the extracted one or more visual elements in the mapping database.

9. The apparatus of claim 8, wherein the sensing resources comprise at least a camera and the visual information is an electronic image captured at the location.

10. The apparatus of claim 8, wherein the attributes of the location may comprise physical objects, hallways, doorways, shapes or colors in the location.

11. The apparatus of claim 8, wherein recording the one or more visual elements in association with the location in the mapping database further comprises the at least one memory and the executable instructions being configured to, in cooperation with the at least one processor, cause the apparatus to identify the location as a new location when the one or more elements do not already exist in the mapping database.

12. The apparatus of claim 8, wherein the mapping database comprises representations for one or more locations that are combined together in the mapping database to form a map, the one or more locations being combined together based at least on common visual elements in the one or more visual elements corresponding to each representation of a location.

13. The apparatus of claim 12, wherein the map corresponds to a structure interior, the representations of locations corresponding to areas within the structure interior.

14. A system, comprising:
   an apparatus; and
   a mapping database;
   the apparatus utilizing sensing resources in the apparatus to sense at least visual information corresponding to the location of the apparatus and identifying attributes of the location by defining one or more visual elements within the visual information corresponding to the attributes;
   the apparatus further utilizing the sensing resources in the apparatus to sense electronic signals and/or fields at the location of the apparatus;
   the apparatus further extracting the defined one or more visual elements from the sensed visual information; and
   the apparatus further creating a representation of the location in the mapping database by recording the extracted one or more visual elements, rather than the sensed visual information, in association with the location in the mapping database,
   wherein recording the extracted one or more visual elements in association with the location in the mapping database comprises the apparatus determining if any of the extracted one or more visual elements already exist in the mapping database by at least using the electronic signals and/or fields sensed at the location to find the extracted one or more visual elements in the mapping database.

* * * * *